United States Patent [19]

Starr et al.

[11] 4,274,205

[45] Jun. 23, 1981

[54] MEASURING FIXTURE

[75] Inventors: James A. Starr; James R. Punches, both of San Jose, Calif.

[73] Assignee: General Electric Company, San Jose, Calif.

[21] Appl. No.: 32,112

[22] Filed: Apr. 23, 1979

[51] Int. Cl.³ .................. G21C 17/06; G01C 7/02
[52] U.S. Cl. ........................... 33/174 L; 33/174 P; 176/19 R
[58] Field of Search ............ 33/125 T, 174 L, 174 Q, 33/174 P, 174 PA, DIG. 19; 176/19 R, 26

[56] References Cited

U.S. PATENT DOCUMENTS

| 3,181,246 | 5/1965 | Jenkins et al. | 33/174 P |
| 3,621,580 | 11/1971 | Tovaglieri | 176/19 R |
| 3,962,794 | 6/1976 | Kima et al. | 33/174 L |
| 4,048,009 | 9/1977 | Weilbacher | 176/19 R |
| 4,120,093 | 10/1978 | Spies | 33/174 L |

Primary Examiner—Richard R. Stearns
Attorney, Agent, or Firm—Ivor J. James, Jr.; Samuel E. Turner; Raymond G. Simkins

[57] ABSTRACT

An accurately formed straight edge member serves as a track for a carriage movable along the length of an elongated component. Distance measuring devices supported by the carriage engage the adjacent surface of the component by which flatness, bow and twist of the component can be determined.

23 Claims, 4 Drawing Figures

MEASURING FIXTURE

BACKGROUND

There are numerous components in industrial and utility installations which require on-site, pre-service inspection and/or periodic in-service inspection to verify continued serviceability. Such inspection frequently includes dimensional measurements. A notable example is the on-site inspection of components of a nuclear reactor, especially replaceable components such as control rods, fuel elements and fuel channels.

For example, a typical fuel assembly having a removable and reusable flow channel is shown in U.S. Pat. No. 3,689,358. Such an elongated square tubular fuel channel may be in the order of 13 cm in transverse cross section dimensions and in the order of 4 m in length. It is necessary to assure that the four major surfaces of such channels are sufficiently flat so as not to interfere with the insertion of control rods between fuel assemblies during operation in the nuclear reactor core. Dimensional tolerances over the length of such a channel may be in the order of 0.127 mm. To perform the necessary flatness measurement of such a component, an elongated accurate and stable measuring fixture is required.

Since flow channels, and other reactor components, which have been subjected to reactor service are radioactive, it is necessary that the measuring device be remotely operable under water to protect the equipment operators from radiation. It is desirable that the measuring device be sufficiently portable for repositioning within a water pool, for movement from one pool to another, and for removal to dry storage when not in use.

Thus an object of the invention is a portable device or fixture for accurate dimensional measurement of radioactive components.

SUMMARY

The dimension measuring fixture of the invention comprises a vertically oriented, elongated, accurately formed straight edge member which serves as a plane of reference and as a track for an instrument bearing carriage. The straight edge member is rectangular in transverse cross section and, as a feature of the invention, it is formed with a series of relatively large holes along its longitudinal axis for enhanced heat distribution to minimize thermal deformation and to provide a high stiffness-to-weight ratio.

The straight edge is supported by an elongated support beam such as an I beam, the straight edge being attached thereto by pivot pins at one end and a sliding spherical bearing at the other end whereby transmission of deforming loads is minimized.

The flow channel, or component to be measured, is supported adjacent the straight edge by a bearing mounted support at the bottom end and an adjustable clamp arrangement at the top end.

As the carriage is moved along the straight edge, measurement devices engage the channel, the measurement direction being such that thermal patterns are symmetrical to reduce thermally-induced-bow measurement errors and in the direction of maximum straight edge stiffness.

DRAWING

The invention is described in greater detail with reference to the accompanying drawing wherein.

DESCRIPTION

Figure 1:
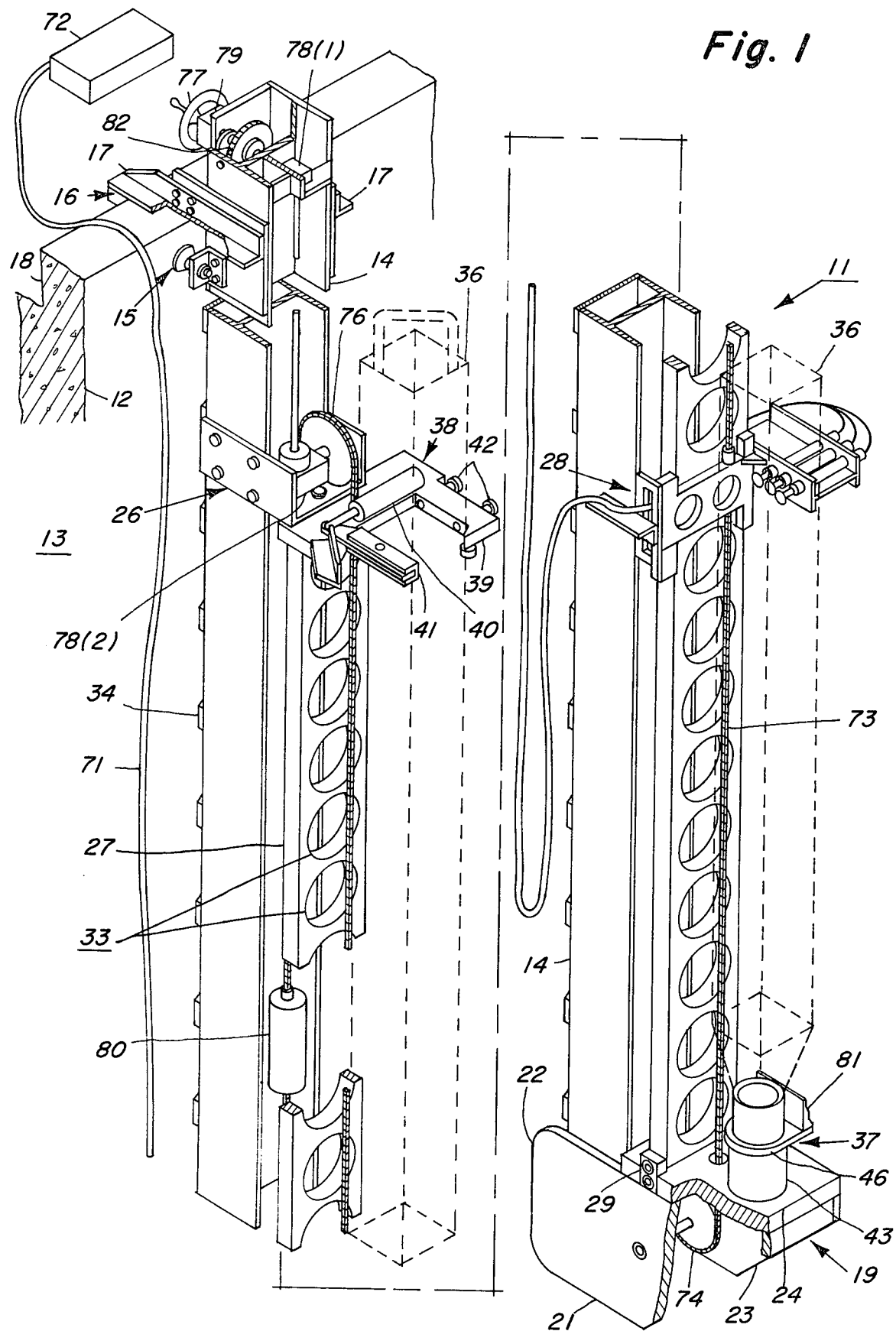
FIG. 1 is an isometric view of a measuring fixture according to the invention as suspended in an operating position from the ledge of a water pool.

A measuring fixture 11 according to the invention is illustrated in FIG. 1 as mounted in operating position along a wall 12 in a pool by water 13. The main frame of the fixture is an elongated support beam 14 shown herein as an H beam.

An upper bracket 16, attached to the beam 14 near its upper end, includes a pair of rearwardly extending arms 17 formed to hook over a ledge 18 of the pool wall 12 to thereby support the fixture 11 in suspension along the wall 12. Adjustable pads 15 provide verticality adjustment.

A lower bracket 19, attached to the beam 14 at its lower end, includes a pair of side plates 21. Rearward extensions 22 abut the wall 12 to position the beam 14 substantially parallel with the wall 12. Forward extensions 23 and a cross plate 24 provide support for other components of the fixture as described hereinafter.

Supported between lower bracket 19 and an intermediate bracket 26 is a straight edge member 27 which serves as an accurate measurement plane of reference and as a track for an instrument bearing carriage 28.

Figure 2:
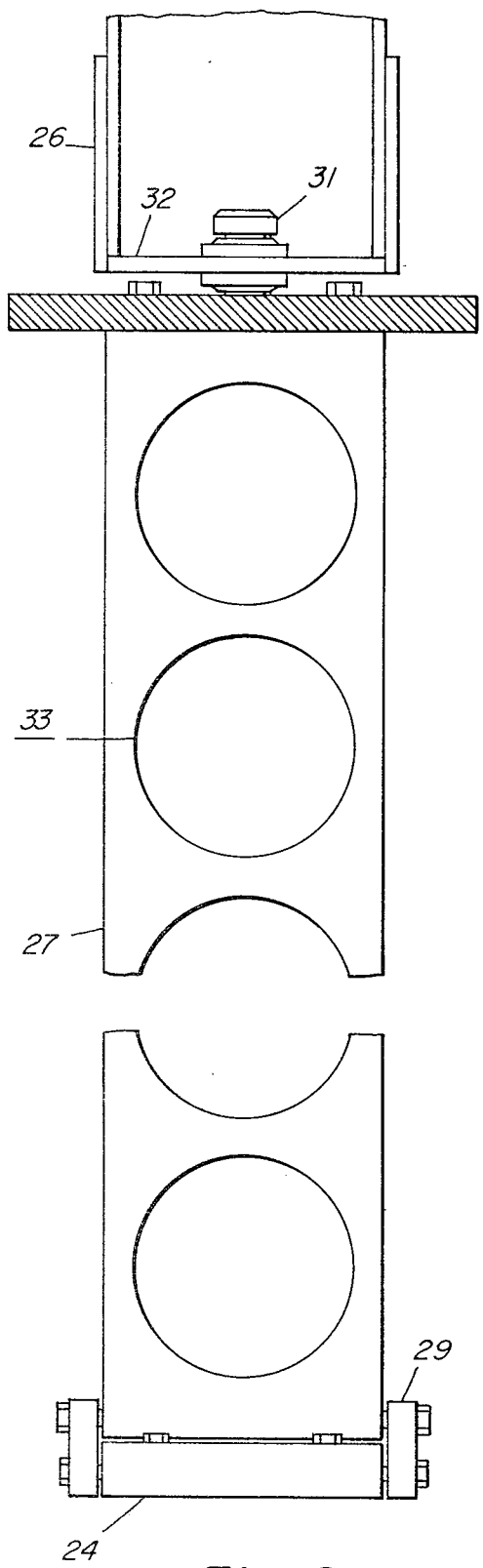
FIG. 2 is an elevation view illustrating the straight edge support arrangement.

As best shown in FIG. 2, straight edge 27 is supported at its lower end by lower bracket 21 with a pair of pivot pins 29, and it is held in position at its upper end by intermediate bracket 26 with a center pin 31 carrying a sliding, spherical bearing journalled in a flange 32 of bracket 26. This mounting arrangement allows the straight edge 27 freedom of thermal expansion and contraction and aids in preventing transmission thereto of deforming loads from other portions of the fixture. To further minimize thermal deformation, the straight edge 27 is formed with a series of relatively large, equally spaced holes 33 along its length.

To minimize torsional distortion of the support beam 14 that would affect the straight edge 27, the portion of beam 14 between intermediate bracket 26 and the lower end of the beam is "boxed in" by a back plate 34 secured, as by welding, to the rear edges thereof. The part of the beam 14 above the intermediate bracket 26 is left unboxed.

Thus any twisting of beam 14, as might occur for example from unevenness of the pool wall 12, takes place in the part of the beam above the intermediate bracket 26 whereby transmission of such deformation to the straight edge 27 is avoided.

The component to be measured, shown in FIG. 1 in phantom view by dashed lines as a fuel assembly flow channel 36 is removably secured in a position generally parallel to the straight edge 27. The channel 36 is supported at its bottom end by a channel support member 37 and is positioned at its top end by a clamp arrangement 38 secured to the top end of straight edge 27.

The clamp arrangement 38 includes a fixed arm 39 and a swinging arm 41, the swinging arm 41 being remotely operable by a hydraulic or pneumatic cylinder 40 in well-known manner. The fixed arm 39 is fitted with a pair of jack screws 42 for adjustment of the alignment of the top end of the channel with the plane of the tips of the measuring devices on carriage 28. The channel contacting faces of the swinging arm 41 and the jack screws may be fitted with material such as nylon to prevent scratching of the channel.

Figure 3:
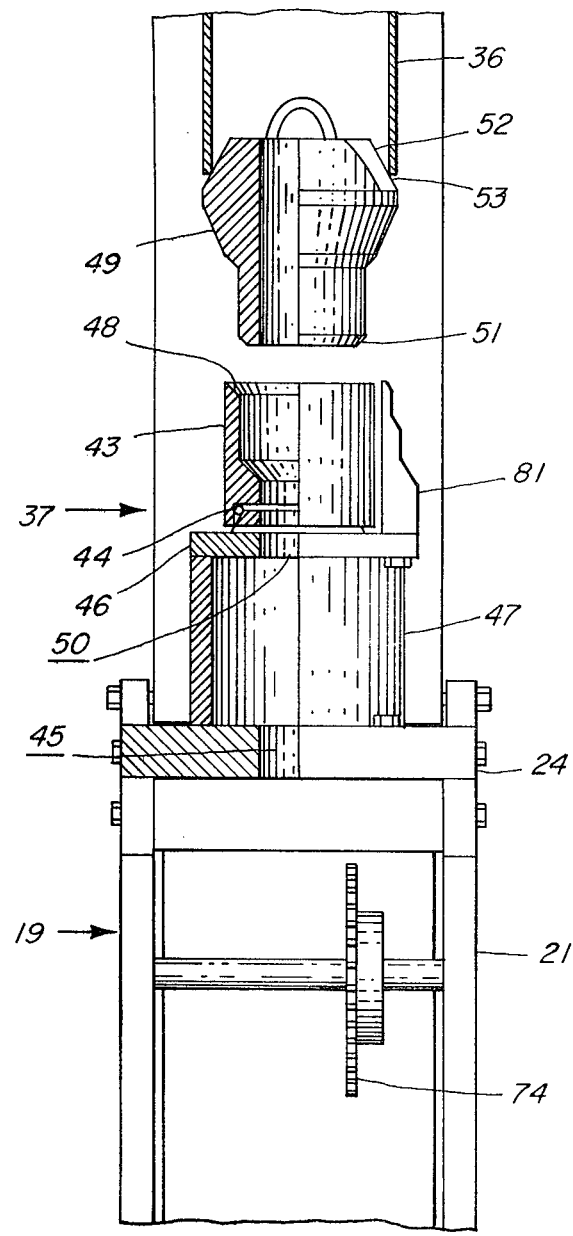
FIG. 3 is an elevation view of the lower portion of the fixture illustrating the channel support member in greater detail.

The channel is supported at its bottom end by channel support member 37, in a manner which does not restrain the channel from rotational motion about is longitudinal axis. This is necessary for measurement of channel twist. As shown in FIG. 3, this feature is provided by a support socket 43 which is journalled to allow rotational motion thereof by an annular ball bearing 44 carried by a bearing plate 46 secured to a spacing sleeve 47 which, in turn, is secured to the cross plate 24 of the lower bracket 19.

The subject measuring fixture is adapted to accommodate and measure empty channels or flow channels which are still mounted on fuel assemblies (as shown in previously mentioned U.S. Pat. No. 3,689,358). Therefore, the upper end of the bore of support socket 43 is appropriately shaped, as at 48, to receive and mate with the nose pieces of the fuel assemblies to be accommodated.

To accommodate empty flow channels, an empty channel adapter 49 is provided. The lower end 51 of the channel adapter has the shape of a fuel assembly nose piece for fitting into the support socket 43. The upper end 52 of the channel adapter has a pyramid shape, or the like, for ease of fitting the square end of the empty channel thereover and the adapter is sized at 53 near the base of the pyramid portion to fix the position of the channel 36 on the channel adapter.

It is noted that, as shown in FIG. 3, the cross plate 24 and the bearing plate 46 are formed with large holes 45 and 50, respectively, and the support socket 43 and the adapter 49 are formed with large through bores. This provides for water circulation through the component being measured which allows water that has become radioactive in the component to drain away thus reducing user exposure. It also provides a convection path to convey heat away from the measuring devices.

Empty channels or fuel assemblies, as the case may be, can be placed in position or removed from the measuring fixture by any suitable lifting and maneuvering device such as an overhead or boom mounted hoist (not shown) which is typically available as an adjunct to a nuclear fuel storage pool. Such hoist arrangements are shown, for example, in copending patent application Ser. No. 747,824 filed Dec. 6, 1976, now U.S. Pat. No. 4,172,760.

Figure 4:
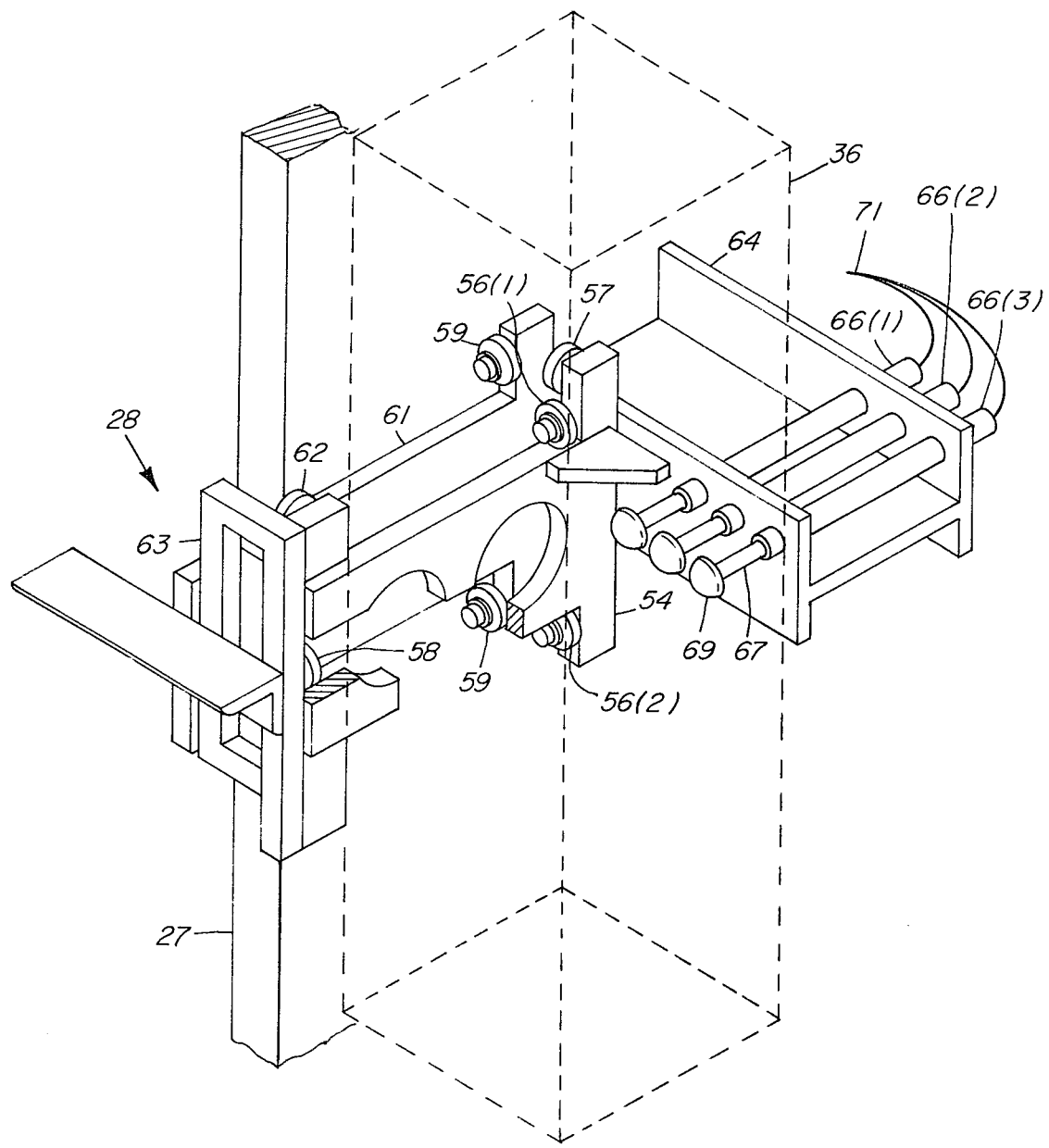
FIG. 4 is an enlarged isometric view of the instrument carriage illustrating its features in greater detail.

Attention is now directed to the instrument carriage 28 shown in FIG. 1 and with greater clarity in FIG. 4. As illustrated herein the carriage 28 which is mounted on the straight edge 27 by a system of rollers or wheels includes a T-shaped front plate 54 which serves as the main frame of the carriage. The front plate 54 is positioned with respect to and guided along the straight edge 27 by a plurality of guide rollers. These guide rollers include a first pair of spaced rollers 56(1) and 56(2) journalled to the T portion of plate 54 for engagement with the right-front face portion of straight edge 27, a second pair of spaced rollers 57 likewise journalled to the T portion of plate 54 but for engagement with the right side of straight edge 27, and a single roller 58 journalled near the left hand end of plate 54 for engagement with the left-front face portion of straight edge 27. A plurality of rollers 59 journalled in a stud-mounted, spring-loaded back plate 61 and a pair of rollers 62 journalled in a stud-mounted, spring-loaded side plate 63 provide pressure on the guide rollers and assure their engagement with straight edge 27.

Secured to the right hand end of plate 54 is an arm 64 suitable for supporting a plurality of distance detectors or other measuring devices 66(1)–66(3) in appropriate position for engagement with the flow channel 36 to be measured. The devices 66(1)–66(3) may be, for example, linear variable differential transformers. Briefly, such a device comprises a linearly movable spring loaded plunger 67 extending from a housing. Movement of the plunger 67 changes the mutual inductance of a pair of coils within the housing. Thus the mutual inductance of the pair of coils can be measured and interpreted as a function of the linear position of the plunger. The plunger 67 is fitted at its outer end with a rounded, smooth-faced nose piece 69 for sliding engagement with the outer surface of the channel 36 to be measured.

Suitable such distance detectors are available from Schaevitz Engineering, U.S. Route 130 and Union Avenue, Pennsauken, New Jersey as catalog item No. GCA-121-500-0624.

The signals from detectors 66(1)–66(3) are transmitted via a cable 71 to a signal processing recording and display device 72 (FIG. 1). A suitable device 72 is available from Schaevitz Engineering as catalog item No. CAS-0653.

To be noted is that the detectors 66(1)–66(3) are supported such that the direction of measurement is in the direction of the major cross section dimension of straight edge 27 and hence in the direction of maximum straight edge stiffness.

As illustrated herein, the carriage 28 is manually movable along the length of straight edge 27 as follows: A roller chain 73 attached to the carriage 28 is engaged by a lower idler sprocket wheel 74 and by an upper driven sprocket wheel 76. Wheel 76 is driven from a hand wheel 77 through suitable shafting and a pair of right-angle gear boxes 78(1) and 78(2). A counter 79 registers the rotations of the hand wheel 76 and can be designed to indicate the position of the carriage 28 along the straight edge 27 in convenient units. Also, a toothed wheel 82 engaged by a spring-loaded ball detent can be keyed to the shaft of hand wheel 77 to provide incremental carriage positioning and prevent carriage drift.

It is noted that the chain 73 is attached to the carriage 28 as nearly as feasible to the center of gravity thereof to minimize twisting forces on the carriage due to the lifting force. Also, a counterweight 80 may be fitted to chain 73 to balance the weight of the carriage 28.

To provide reference readings to the processing device and to check linearity of the detectors, a calibration block 81 is secured to the bearing plate 46 of support member 37 as shown in FIG. 3. The block 81 is stepped to provide three reference planes for engagement with the distance detectors 66(1)–66(3). The center step can be, for example, a zero reference plane, the lower step a positive reference plane and the upper step a negative reference plane.

Operation of the measuring fixture is as follows: A flow channel to be measured is placed on the support socket 43 and clamped in position by clamp arrangement 38 as previously described. Operation of handwheel 77 moves the carriage 28 along straight edge 27 and the detectors 66(1)–66(3) provide signals indicative of the profile of the center and outer tracks of their engagement with the adjacent side of the channel. From these profile traces, flatness, bow and twist of that side of the channel can be determined. The other sides of the channel similarly can be measured by release of clamp 38, rotation of the channel by ninety degrees and reengagement of the clamp.

In an embodiment of the measuring fixture the straight edge 27 is about 2 inches (5.1 cm) thick, 8" (20.3 cm) wide and 14 feet (43 m) long. It is formed of carbon steel for machineability, accurately ground and electroless nickel plated for corrosion resistance. The holes 33 are about 5.5 inches (14 cm) diameter spaced about 7.5 (19.1 cm) center-to-center. The support beam 14 is an 8 inch (20.3 cm) H beam. This and other structural members of the fixture are preferably formed of aluminum to minimize the weight of the fixture for ease of portability.

What is claimed is:

1. A device for measuring dimensional characteristics of an elongated component comprising: a vertically positioned elongated support beam; an elongated straight edge member supported and held in a position generally parallel to said support beam by support means at its ends secured to said support beam, the support means at one end of said straight edge providing freedom of longitudinal expansion and contraction of said straight edge and freedom from torsional constraint thereof, the support means at the other end of said straight edge providing torsional constraint whereby said straight edge is torsionally constrained only at said other of its ends; means for mounting said component in generally parallel alignment with said straight edge; a carriage mounted on said straight edge for movement along the length thereof adjacent said component; and at least one measuring device mounted on said carriage for indicating variation of the distance between said component and said carriage as said carriage is moved along said straight edge.

2. The device of claim 1 wherein said support means at one end of said straight edge includes a slidable, spherical bearing.

3. The device of claim 2 wherein said support means at the other end of said straight edge includes a pair of pivot pins engaging said straight edge.

4. The device of claim 1 wherein said straight edge is rectangular in transverse cross section shape.

5. The device of claim 4 wherein said straight edge is formed with a series of relatively large holes through its thickness to minimize thermal distortion thereof.

6. The device of claim 4 wherein said measuring device includes a body secured to said carriage and resiliently supporting a movable element adapted to maintain contact with said component as said carriage is moved along said straight edge and wherein movement of said movable element is in the direction of the width of said straight edge.

7. The device of claim 1 wherein said support beam has a length greater than the length of said straight edge and wherein the portion of said support beam between the support means at the ends of said straight edge includes means for increasing the torsional distortion resistance of said portion of said beam whereby transfer of torsional distortion of said beam to said straight edge is minimized.

8. The device of claim 1 wherein said straight edge is mounted between an intermediate bracket and a lower bracket both secured to said support beam.

9. The device of claim 8 further including a component support socket secured to said lower bracket for receiving and positioning the lower end of said component, said support socket being journalled to allow rotational motion of said component about its longitudinal axis whereby the lower end of said component is free from torsional constraint; and a selectively operable clamp arrangement secured to the upper end of said straight edge for receiving and holding the upper end of said component in position with respect to said straight edge, said clamp arrangement including adjustable stops engaging said component to dictate its angular position.

10. The device of claim 9 wherein said component is a flow channel mounted on a nuclear fuel assembly and wherein a bore of said support socket is formed to mate with the nose piece of said fuel assembly.

11. The device of claim 9 wherein said component is an empty nuclear fuel assembly flow channel provided with an adapter for mating the lower end of said flow channel to said support socket.

12. The device of claim 9 wherein said clamp arrangement includes a remotely operable movable arm.

13. The device of claim 8 including a calibration block providing a plurality of reference planes engageable by said measuring device.

14. The device of claim 8 further including an upper bracket secured to the upper end of said support beam for suspending said device from a wall of a pool of shielding water.

15. The device of claim 14 including remotely operable means for moving said carriage along said straight edge comprising a chain secured at both ends to said carriage and threaded over an idler sprocket mounted on said lower bracket and a driven sprocket mounted on said intermediate bracket; a handwheel operable at pool side shaft mounted on said upper bracket and shaft linkage means transmitting rotary motion of said handwheel to said driven sprocket.

16. The device of claim 15 including a counter coupled to the shaft of said handwheel for indicating rotations thereof by which the position of said carriage along said straight edge can be determined.

17. The device of claim 15 including a detent wheel fixed to the shaft of said handwheel for providing incremental positioning of said carriage along said straight edge.

18. The device of claim 15 wherein said chain is attached to said carriage near the center of gravity thereof.

19. The device of claim 15 including a counter weight attached to said chain to substantially balance the weight of said carriage.

20. The device of claim 14 wherein said means for mounting said component includes a relatively large passage for water circulation through said component.

21. The device of claim 1 wherein said carriage is mounted on said straight edge by a system of rollers.

22. The device of claim 1 wherein said component has a substantially square transverse cross section and wherein a plurality of spaced measuring devices are mounted on said carriage for providing distance variation measurements along a like plurality of spaced tracks along the length of the adjacent side of said component from which flatness, twist and bow of that side of said component can be determined.

23. The device of claim 22 wherein said measuring devices produce electrical signals and including a processing device for receiving said signals.

* * * * *